United States Patent [19]

Chapman, Jr.

[11] 4,352,479

[45] Oct. 5, 1982

[54] ADJUSTABLE SUPPORT

[75] Inventor: Ivan B. Chapman, Jr., Baltimore, Md.

[73] Assignee: Western Electric Company, Inc., New York, N.Y.

[21] Appl. No.: 127,670

[22] Filed: Mar. 6, 1980

[51] Int. Cl.³ .......................................... F16M 11/00
[52] U.S. Cl. ................................. 248/405; 248/188.4
[58] Field of Search ................. 248/188.4, 656, 405, 248/354 S

[56] References Cited

U.S. PATENT DOCUMENTS

| | | | |
|---|---|---|---|
| 267,357 | 11/1882 | McKernan | 280/43.24 X |
| 3,805,629 | 4/1974 | Martin et al. | 248/188.4 |

Primary Examiner—Wayne L. Shedd
Attorney, Agent, or Firm—E. W. Somers

[57] ABSTRACT

A work surface is supported for adjustment in a vertical direction by a device which includes a base and an angle post upstanding therefrom with a column mounted for sliding movement in engagement with the post. The work surface is mounted on an upper end of the column which is moved slidably by manual movement of a ratchet type mechanism and which is maintained in engagement with the post by an arrangement which provides for three dimensional as well as torsional stability. The work surface is provided with a further degree of mobility by mounting an axle and wheels on the base in such a way that the axle is moveable between a rest position in which the base rests on a floor and a mobile position in which the base is spaced above the floor by the wheels which ride thereon.

2 Claims, 6 Drawing Figures

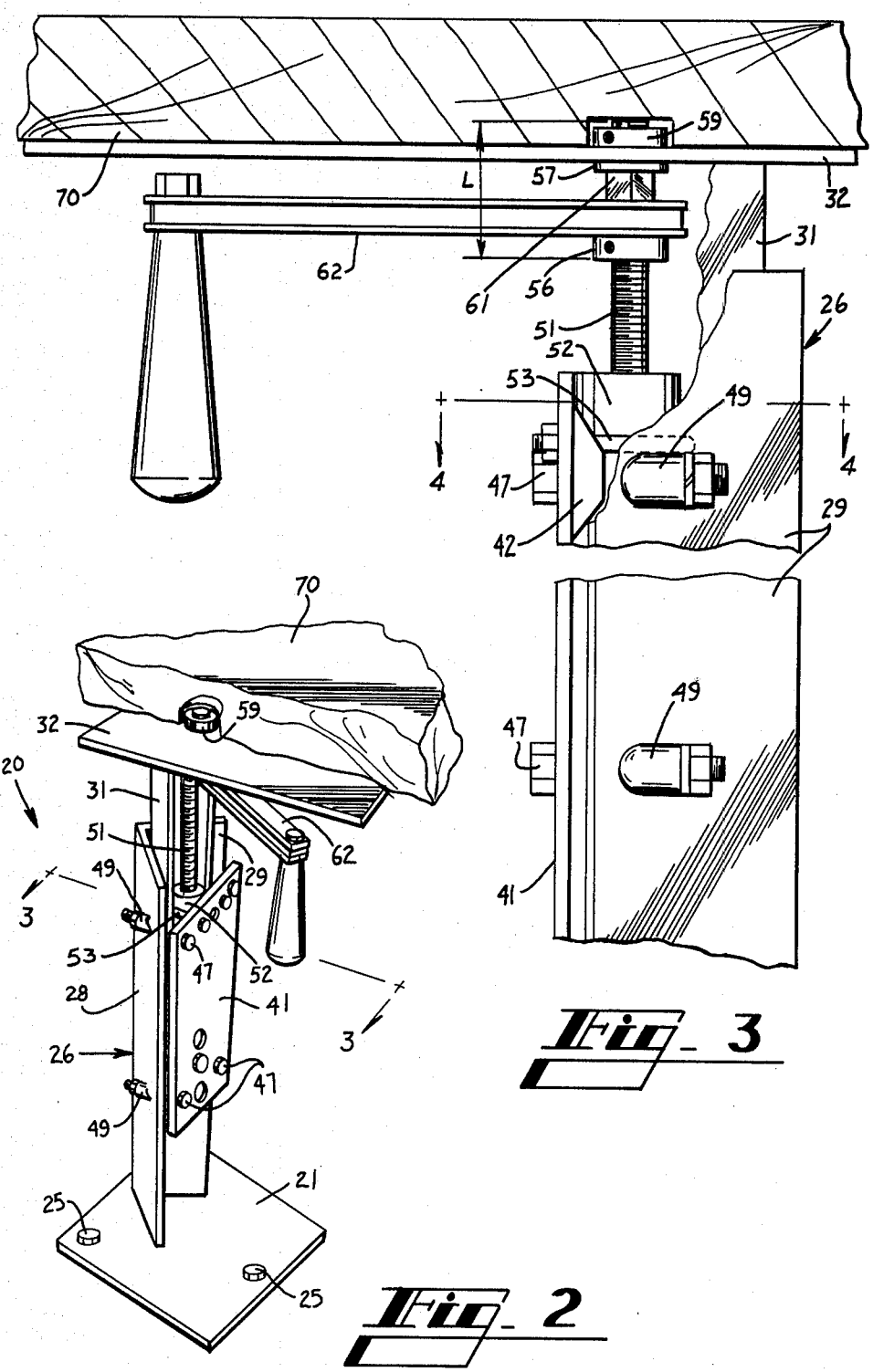

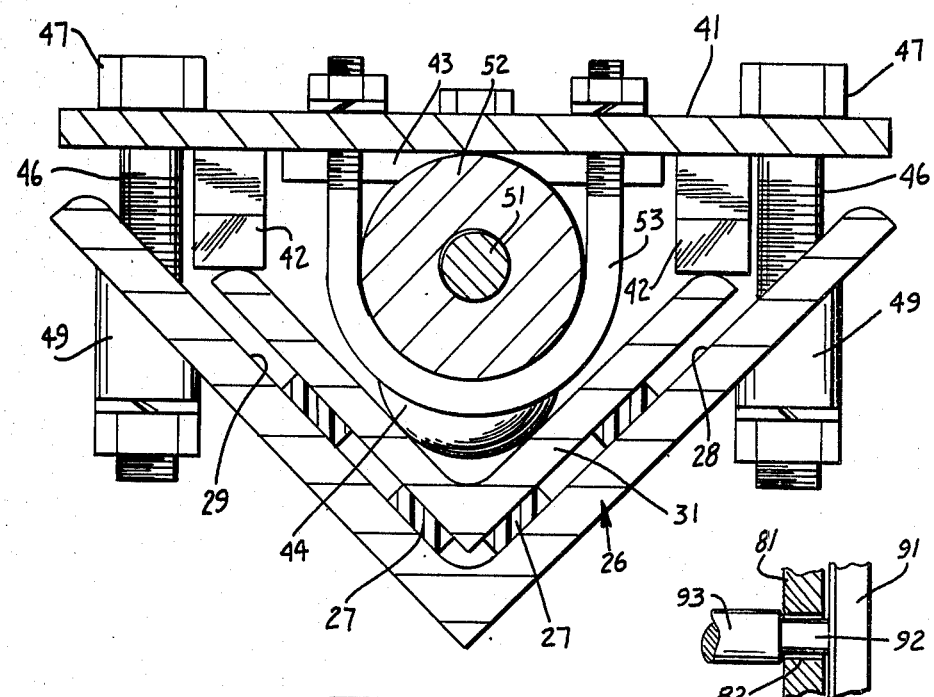
Fig. 4
Fig. 5A
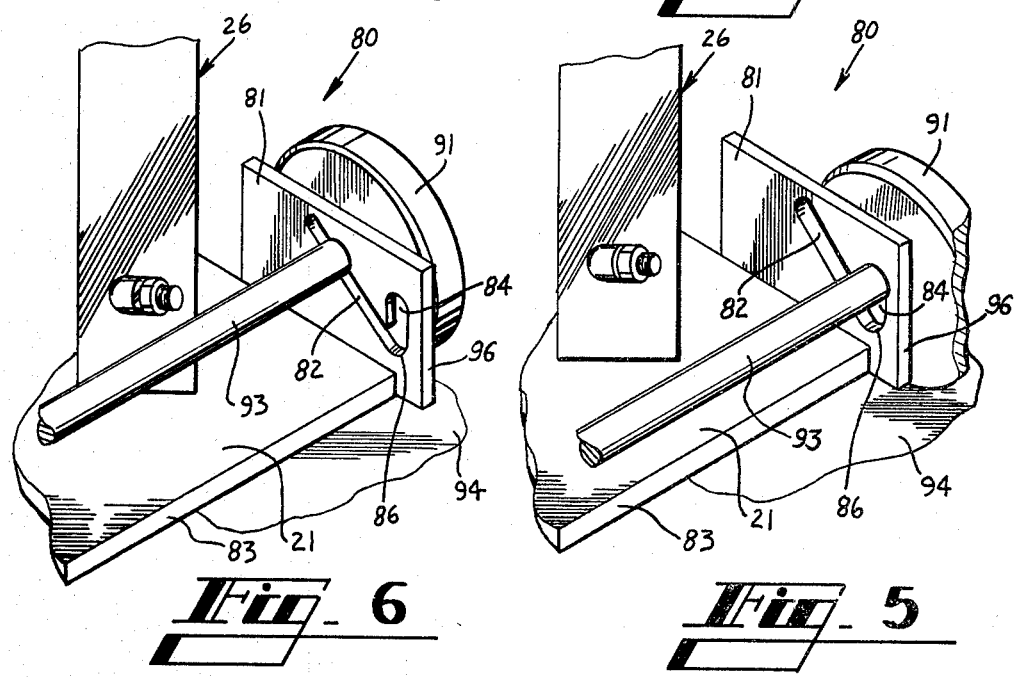
Fig. 6
Fig. 5

ADJUSTABLE SUPPORT

TECHNICAL FIELD

This invention relates to an adjustable support and more particularly, to a work surface which is supported so that it is capable of being moved to a desired level above a floor.

BACKGROUND OF THE INVENTION

In today's work environment, there is increasing emphasis placed on anthropometry and its relation to factory and office equipment. Such equipment is designed not only to perform a particular task but also to conform more closely to the capabilities of human movements without undue stress.

Not only are such considerations taken into account in the design of person-operated equipment, but also in providing such equipment with the capability of on the job adjustments. It will be remembered that chairs have been manufactured for some time with the capability of adjusting the height of the seat as well as the rotational orientation of the seat relative to the work position.

There has been a desire to provide a similar capability for the surface which supports various kinds of equipment such as for example, typewriters and computer terminals as well as factory hand tools or assembly fixtures. This would permit an office or a factory workperson to adjust the level of the work surface with respect to the floor and with respect to the seat to facilitate biomechanical movements and to lessen work fatigue.

Along with the above-mentioned desire is the need to be able to easily relocate a work station with respect to other equipment. For example, a workperson who is operating a memory type typewriter and print out unit may wish to relocate a screen which is supported independently of a high speed printer closer to or farther from the printer or to position the separately supported units in an arrangement which is best suited to his or her biomechanical peculiarities.

The prior art includes U.S. Pat. No. 3,888,444 which shows an adjustable support column for tables and which includes a pair of telescoping tubular members of rectangular cross-sections that are moved relative to each other by a screw shaft turned by a motor. A portable jack having a load plate which is moved upwardly or downwardly by a jack screw assembly is shown in U.S. Pat. No. 4,169,581. While these patents disclose devices for providing portability and maneuverability of support surfaces, neither provides a simplistic arrangement which would be attractive for large scale manufacture yet which would provide the degree of stability necessary for sensitive electronic equipment.

What is required and what the prior art appears to lack is a support for a work surface, said support capable of being manually adjustable with respect to height above a floor and which may easily be repositioned on the floor to suit the particular needs of a workperson.

SUMMARY OF THE INVENTION

The foregoing needs which are seemingly not satisfied by the prior art are met by the adjustable support of this invention, said support including a post which is attached to a base. A column is mounted to the post for telescoping movement relative to the post so that a work surface which is attached to an upper portion of the column may be moved selectively upwardly or downwardly. Means connected to means for mounting the column to the post and to the work surface hold the column at a desired vertical position relative to the post. The support also includes means for causing the column to be moved upwardly or downwardly and facilities which are attached to the mounting means for providing torsional stability for the column when it is in an extended position relative to the post so that sensitive equipment such as word processors may be supported.

In an alternative embodiment in which the adjustable support may be moved from one work station to another, the base includes a pair of spaced, slotted side plates. The side plates support rotatably an axle on each end of which is mounted a wheel. The slots are arranged so that the axle is capable of being moved between one position in which the base is supported on a floor and another position in which the base is supported above the wheels that engage the floor.

BRIEF DESCRIPTION OF THE DRAWINGS

Other features of the present invention will be more readily understood from the following detailed description of specific embodiments thereof when read in conjunction with the accompanying drawings, in which:

FIG. 2 is a perspective view of the adjustably supported work support of FIG. 1 in an assembled condition;

FIG. 3 is an enlarged detail view of a portion of the apparatus shown in FIG. 2 and taken along lines 3—3;

FIG. 4 is a sectional view of portions of the apparatus of FIG. 3 taken along lines 4—4 thereof;

FIG. 5 is a perspective view of a portion of an alternative embodiment of the apparatus of FIG. 1 to provide the apparatus with mobility;

FIG. 5A is a detailed view of a portion of the alternative embodiment in FIG. 5 and showing a mounting arrangement for an axle; and FIG. 6 is another view of the alternative embodiment of FIG. 5 with the apparatus immobilized at a work station.

DETAILED DESCRIPTION

Figure 1:
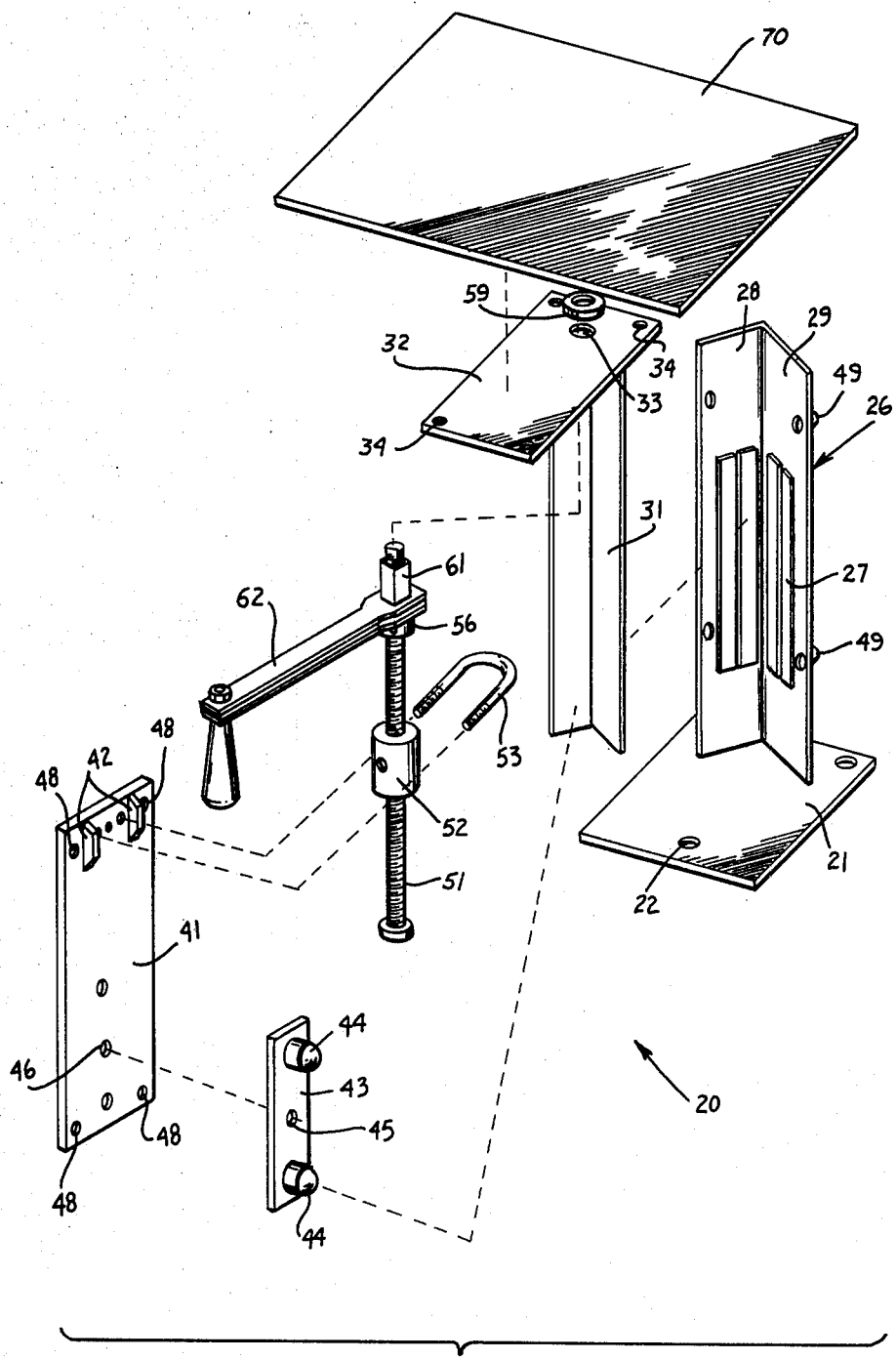
FIG. 1 is an exploded perspective view of an adjustable work support in accordance with this invention.

Referring now to FIGS. 1 and 2, there is shown an adjustable work support apparatus, designated generally by the numeral 20, for providing a work support surface that is capable of being adjusted relative to a building floor to a level desired by a workperson. The apparatus 20 includes a base plate 21 having holes 22-22 formed therein so that it can be secured to a floor with fasteners 25-25 turned through the holes 22-22.

The apparatus 20 also includes a post 26 which in a preferred embodiment is in the form of an angle that is upstanding from and connected to the base plate 21. As is best seen in FIGS. 1 and 3, the post 26 has a plurality of strips 27-27 attached to inner faces 28 and 29 of the angle and extending in a generally vertical direction. The strips 27-27 are made of a material having a low coefficient of friction such as for example, nylon plastic material.

Adapted to be held in engagement with the strips 27-27 is a moveable column 31 which preferably is in the form of an angle having a leg size which is less than that of the angle 26. A plate 32 is attached to an upper end of the moveable column 31 and has an opening 33 and a plurality of openings 34-34 extending therethrough.

The column 31 is held in engagement with the strips 27-27 by a retainer plate 41 which extends vertically and which has a width about equal to the distance between the free longitudinal edges of the post 26 (see especially FIG. 3). The plate 41 is designed so that when it is assembled together with the column 31 and the post 26, internal toe guides 42-42 (see FIG. 4) which are made of plastic and which are attached to an upper end of the plate 41 engage the free longitudinal edge portions of the angle column 31.

Further, a caster bracket 43 having a pair of ball bearing units 44-44 spaced therealong is attached to the retainer plate 41 by a bolt (not shown) which extends through an opening 45 in a bracket 43 and through an aligned opening 46 in the plate 41 so that the bearing units are aligned along a vertical axis. When the plate 41 is assembled to the post 26 with a column 31 therebetween, the ball bearing units 44-44 engage the inwardly facing surfaces of the angle column to stabilize the column. Moreover, these ball bearings 44-44 cooperate with the toe strips 42-42 to maintain the column 31 in engagement with the post 26.

The retainer plate 41 is assembled to the post 26 by a plurality of bolts 47-47 which extend through holes 48-48 in the retainer plate. The ends of the bolts 47-47 extend through pedestals 49-49 attached to the outwardly facing surface of the legs of the angle post 26 (see especially FIGS. 2, 3 and 4).

In order to cause the support plate 32 to be moved vertically upwardly or downwardly as desired by the workperson, the support apparatus 20 includes provisions for manually telescoping the column 31 with respect to the post 26. A threaded rod 51 extends through a nylon bushing 52 which is held in engagement with an upper portion of the retainer plate 41 by a U-bolt 53 having threaded ends which extend through openings in the retainer plate. The bushing 52 has an internally threaded passageway formed therethrough with the threads matching those on the rod 51 which extends through the passageway.

An upper end portion of the rod 51 is adapted to have the support plate 32 and manually operable turning means attached thereto. In order to accomplish this, a length "L" (see FIG. 3) has a flat formed thereon with a locking collar 56 attached to the rod at the lowermost end of the flat. The upper end of the rod 51 has a locking washer 57 attached thereto and then extends through a nylon washer (not shown) and through the opening 33 in the plate 32. Another locking collar 59 is attached to the free end flat portion of the rod 51 so that the support plate 32 is captured between the upper locking collar 59 and the washer 57.

The portion of the rod 51 between the upper side of the locking washer 56 and the lower face of the locking washer 57 is enclosed by a length of tubing 61 having a square cross-section. A commercially available ratchet wrench 62 such as an Astro Ratchet Wrench sold by the Lowell Company of Worcester, Massachusetts under a catalog designation "No. ⅜ inch square" is mounted on the rod 51 as shown in FIG. 3 with the tubing 61 extending through a square opening in the wrench.

The rod 51 is a so-called Acme threaded rod so that a turning motion in one direction as applied by the ratchet wrench 62 to the tubing 61 and hence to the rod 51 causes the locking washer 57 to be moved upwardly to cause the support plate 32 to be moved upwardly in a vertical direction. An opposite rotary motion imparted to the wrench 62 will cause the locking collar 59 to apply forces to the support surface 32 to cause it to be moved in an opposite vertical direction.

As shown in FIGS. 1, 2 and 3, a work surface 70 is attached to the support plate 32 by fasteners extending through the openings 34-34. The surface 70 may be one which is used to support various work operations such as assembling in a factory environment or fixtures for operations such as soldering. Of course, these are only exemplary and the apparatus 20 may find use in an office environment to support typewriters or computer terminals or word processing equipment.

The apparatus 20 as described thus far is adjustable with respect to height so as to be biomechanically suitable for a workperson. In an alternative embodiment, an apparatus 80 includes the apparatus 20 with the base plate 21 being supported so that the apparatus is rendered mobile to permit its use at any selected work position on a floor.

Going now to FIGS. 5 and 6, it can be seen that the base plate 21 has a pair of side plates 81-81 (only one being shown) attached to opposite side edges surfaces of the plate. Each of the side plates 81-81 has a slot 82 formed therein with the slot being inclined so that its lowermost portion is adjacent a rear edge 83 of the plate 21. Further, each slot 82 has a portion 84 extending vertically from its lowermost end 86. It is important to the operation of the device that the top of the vertical portion 84 is spaced substantially closer to the plate 21 than an uppermost end of the inclined slot 82.

Mobility is provided by a pair of wheels 91-91 each of which is mounted on an end of an axle 92 that extends through the slots 82-82 (see also FIG. 5A). Each of the wheels 91-91 is adjacent an outwardly facing surface of one of the side plates 81-81. As can be seen in FIG. 5A, the portion of the axle 92 between inwardly facing surfaces of the side plates 81-81 may be enclosed by a length of pipe 93. When the axle 92 is received in the portions 84-84, the wheels 91-91 extend below the base plate 21. On the other hand, when the axle is at the upper ends of the slots 82-82 (see FIG. 6), the wheels 91-91 do not extend below the base plate; hence in that instance the base plate and not the wheels engages a floor 94.

The location of the post 22 with respect to the rear edge 83 of the base plate 21 and the axle 92 is important to the operation of the apparatus 80. In a preferred embodiment, the upper ends of the inclined slots 82-82 which have a width of about 1.27 cm are about 6.4 to 7.6 cm from the edges 96-96 of the side plates 81-81. A lowermost portion of the slots 82-82 is about 1.27 cm above the top of the base plate 21 and about 1.27 cm from the edges 96-96. When the axle 92 is moved upwardly to the ends of the inclined portions of the slots 82-82 from the position shown in FIG. 6, the pipe 93 is substantially in engagement with the post 26. Also, in the preferred embodiment, the upper ends of the slots 82-82 are about 4.76 cm above the upwardly facing surface of the plate 21, which has a thickness of about 1.2 cm, while the upper ends of the portions 84-84 are about 2.22 cm above said surface of the base plate, and the wheels have a diameter of 10 cm.

As can be seen in FIGS. 5 and 6, the vertical centerlines of the portion 84-84 of the slots are generally aligned with the edge 83 of the base plate 21. Also, the vertical centerline of each portion 84 intersects the longitudinal inclined centerline of its associated slot 82 at a point which is above the bottom of the slot. Depending on the dimensions of a specific embodiment of a support apparatus which is made in accordance with this invention, it may be advantageous to have the lower end of the inclined portion of each slot 82 connected with its associated vertical portion 84 through a relatively short horizontal length of slot. This arrangement of each slot may facilitate the movement of the axle 92 between its two positions.

In operation of the alternative embodiment, assume that the apparatus 80 is such that the base plate 21 is in engagement with the floor 94 (see FIG. 6), but that it is desired to relocate the apparatus elsewhere. A workperson pushes on the post 26 to elevate the rear edge 83 of the plate 21 above the floor 94 and permit the axle which had been at the upper reaches of the slots 82-82 to descend along the slots toward the portions 84-84. Then the workperson positions one foot in engagement with the pipe 93 and pulls on an upper portion of the post 26 to tilt the apparatus 80 toward the body whereupon the axle is moved into the portions 84-84 of the slots (see FIG. 5). This renders the apparatus 80 mobile and permits the workperson to be able to push or pull the apparatus to another location.

Once the apparatus 80 has been relocated on the floor 94 or to another floor, the workperson pushes on an upper end of the post 26 to allow the axle 92 to descend within the portions 84-84 to their intersections with the inclined slots 82-82 and then with sufficient angle of tilt, the axle 92 will roll along the inclined slots until it reaches their upper ends as shown in FIG. 6. The workperson can again engage one foot with the pipe 93 to maintain its position in the slots 82-82 and then allows the post to assume the vertical position whereupon the plate 21 engages the floor to maintain the surface 70 useable for a particular work operation.

With the apparatus 80 or 20 in a desired work location, the workperson applies a turning movement to the wrench 62 to cause the work surface 70 to be moved to a suitable height above the floor 94. Typically, for use in a factory environment, the post 26 has a height of about 46 cm and the top of the column 31 is in the range of about 18 to 31 cm extended above the top of the post to cause the work surface to be in the range of about 64 to 76 cm above the floor 94.

It is to be understood that the above-described arrangements are simply illustrative of the invention. Other arrangements may be devised by those skilled in the art which will embody the principles of the invention and fall within the spirit and scope thereof.

What is claimed is:

1. Apparatus for adjustably supporting a work surface at a desired level above a floor at a work station, said apparatus comprising:
   a base;
   a post attached to and upstanding from said base, said post comprising a pair of plates connected together along longitudinal edges thereof;
   a plurality of strips which are made of a plastic material and which are attached to an inwardly facing surface of each of said plates of said post;
   a column which comprises a pair of elongated plates attached together along longitudinal edges, said column being in engagement with said plastic strips on the inwardly facing surfaces of said post;
   a retainer plate extending at least partially along the length of said post;
   a bearing device which includes a mounting bracket having spaced bearings attached thereto, said bearings engaging inwardly facing surfaces of said elongated plates of said column;
   means for securing said retainer plate to said post and for securing said bearing device to said retainer plate with said bearings in engagement with said column, said means being effective to hold said column in juxtaposition with said strips of plastic material and to facilitate movement of said column relative to said post to extend said column from said post and position the work surface at a desired level above the floor;
   guide members which are attached to said retainer plate and spaced apart to be engaged by longitudinal free edges of said elongated plates of said column when said column is held in engagement with said plastic strips for preventing unintentional turning movement of said column when said column is extended from said post;
   a support plate attached to an upper end of said column, said support plate adapted to have the work surface attached thereto;
   internally threaded bushing means attached to said retainer plate;
   a threaded rod extending through said bushing means and connected to said support plate; and
   means for turning said threaded rod to cause said rod to be moved through said bushing means to move said support plate.

2. The apparatus of claim 5, wherein said base comprises a base plate having upwardly and downwardly facing major surfaces with said post being attached to said upwardly facing surface and which also includes means for moving said post from one work station to another, said means including:
   a pair of spaced parallel side plates upstanding from said base plate adjacent one end of said base plate, each of said spaced parallel plates having an inclined slot formed therein with the slots in said plates being in alignment with each other transversely of said base plate, each said slot sloping downwardly toward said end of said base plate and having a vertically extending portion at a lower end thereof with an upper end of said inclined portion being substantially above the upper end of said vertically extending portion;
   an axle extending through said aligned slots, said aligned slots being arranged so that the axle is capable of being moved from a first position, where said axle extends through said inclined portions at said upper ends thereof, to a second position in said vertically extending portions of said slots; and
   a wheel which is mounted on each end of said axle adjacent an outwardly facing surface of each said side plate, said wheels extending no lower than said downwardly facing surface of said base plate when said axle occupies said first position so that said base plate engages the floor to maintain said apparatus in a rest position in one work station, said axle capable of descending toward said lower ends of said slots to facilitate its entry into its second position when said base plate is tilted to engage the other end thereof with the floor, said axle in the second position in said vertically extending portions being effective to cause said wheels to extend below said base plate to hold said base plate above the floor and render said wheels operable to permit said apparatus to be moved from the one work station to another.

* * * * *